(12) United States Patent
Beck et al.

(10) Patent No.: US 6,234,462 B1
(45) Date of Patent: May 22, 2001

(54) SELF-PUMPING HYDRO-PNEUMATIC SPRING STRUT WITH INTERNAL LEVELING

(75) Inventors: Hubert Beck, Eitorf; Werner Kuchheuser, Windeck; Willi Wortmann, Hennef, all of (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/287,786

(22) Filed: Apr. 7, 1999

(30) Foreign Application Priority Data

Apr. 7, 1998 (DE) .............................................. 198 15 459

(51) Int. Cl.$^7$ .............................. F16F 9/14; B60G 17/00
(52) U.S. Cl. .................................. 267/64.17; 267/DIG. 2
(58) Field of Search ........................... 267/64.14, 64.17, 267/DIG. 1, DIG. 2

(56) References Cited

U.S. PATENT DOCUMENTS

| | | | | |
|---|---|---|---|---|
| 2,436,573 | * | 2/1948 | Heynes ................................ | 267/64.17 |
| 3,110,485 | * | 11/1963 | Axthammer ........................ | 267/64.17 |
| 4,577,840 | * | 3/1986 | Meller et al. ........................ | 267/64.17 |
| 5,941,508 | * | 8/1999 | Murata et al. ...................... | 267/64.17 |

* cited by examiner

Primary Examiner—Robert J. Oberleitner
Assistant Examiner—Robert A. Siconolfi
(74) Attorney, Agent, or Firm—Cohen, Pontani, Lieberman & Pavane (57) ABSTRACT

A spring strut having a delayed bleed. The spring strut includes a non-return valve arranged parallel to the throttle such that the flow of oil can pass through the non-return valve from the low-pressure chamber in the direction of the pump cylinder.

11 Claims, 10 Drawing Sheets

SELF-PUMPING HYDRO-PNEUMATIC SPRING STRUT WITH INTERNAL LEVELING

BACKGROUND OF THE INVENTION

1. Field of the Invention

The invention relates hydro-pneumatic spring struts and more particularly, to a self-pumping hydro-pneumatic spring strut with internal leveling.

2. Description of the Related Art

Spring struts of this kind are already known (for example, DE 33 06 393 C1), in which the throttle is formed by an orifice between a valve body of the suction valve and that end face of a sleeve which faces said valve body. Between the throttle and the bleed orifice, the inner wall of the pump rod is utilized as a bleed duct. Pressure equalization between the high-pressure chamber and the low-pressure chamber takes place, initially, via the relatively large bleed orifice insensitive to dirt, along the bleed duct, through the throttle and, from there, centrally through the pump rod. Since the throttle is mounted between the suction valve plate and the end-face valve seat of the sleeve, there is virtually no risk of the throttle being clogged by particles in the damping medium. This is due to the valve plate being lifted from its seat, which results in the throttle being opened constantly and being flushed free by the damping medium. However, a design of this type is complicated and the individual pump rod lengths, together with their sleeves of correspondingly differing length, in each case have to be adapted to the overall length of the spring strut. This means that, in different instances of use, spring struts of different length are also employed, which in each case require a corresponding pump rod. Furthermore, the dimensional accuracy of the sleeve and of its receiving bore in the pump rod must be made perfect, and, since the valve plate which, together with the end face of the pump rod, forms the control edges, re-machining or cutting of the control edges is necessary after the sleeve has been installed in the pump rod.

SUMMARY OF THE INVENTION

An object of the invention is to provide a simple, functionally reliable and insensitive spring strut, in which, while the prolonged bleed time is preserved, the bleed device can easily be produced under a series of conditions and which can be used, irrespective of the length of the pump rod, of the pump cylinder or of the piston rod.

This and other objects are achieved according to the invention, in that a non-return valve is arranged parallel to the throttle, through which the flow can pass from the low-pressure chamber in the direction of the pump cylinder.

It is advantageous, at the same time, that the throttle and the non-return valve are designed independently of the respective construction and can be arranged at any desired location between the low-pressure chamber and the pump cylinder. The parallel connection of the throttle and non-return valve affords the further advantage that the oil can flow through, throttle-free, in the suction direction and, throttled, in the discharge direction.

According to a further embodiment, there is provision for the throttle and the non-return valve to form a common structural part. It is advantageous, in this case, that the throttle and non-return valve can be produced as a pre-assembled structural unit which can then be introduced as a unit into the appropriate position when the spring strut is being assembled.

According to a further embodiment, a cross-sectional narrowing is provided as a throttle. In an embodiment which favors manufacturing, a platelike elements is provided as a non-return valve which is controlled into one of the two possible end positions by the flow of the oil. Advantageously, in this case, the platelike element is loaded on at least one side by a spring.

In order to achieve sufficient axial guidance on the outer wall and, at the same time, obtain corresponding flow cross sections, the platelike element has a circumference that is not round.

According to another embodiment which favors manufacturing, a recess in the pump rod is provided as a throttle.

According to yet a further embodiment, there is provision for the platelike element to cooperate with the end face of the pump rod. Advantageously, in this case, in order to form the throttle, a recess is provided between the end face of the pump rod and the platelike element.

In a preferred embodiment, the non-return valve is provided as a ball which is controlled into one end position or the other by the flow of the oil.

If the throttle and non-return valve are used in a common structural part, there is provision, according to an essential feature, for the structural part to be received within the pump rod.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Preferred exemplary embodiments of the invention are illustrated diagrammatically in the drawings, in which:

FIG. 3b is a view of the non-return valve of FIG. 3a;

FIG. 3c is a view of the throttle of FIG. 3a;

FIG. 4a is a partial sectional view of a throttle and a spring-loaded non-return valve according to the embodiment of FIG. 3a;

FIG. 4b is a view of the non-return valve of FIG. 4a;

FIG. 4c is a view of the throttle of FIG. 4a;

FIG. 5b is a top view of a structural part supporting the non-return valve shown in FIG. 5a;

FIG. 5c is a view of the throttle of FIG. 5a;

FIG. 6a is a partial sectional view of a throttle and a spring-loaded non-return valve according the embodiment of FIG. 5a;

FIG. 6b is a is a top view of a structural part supporting the non-return valve shown in FIG. 6a;

FIG. 6c is a view of the throttle of FIG. 6a;

DETAILED DESCRIPTION OF THE PRESENTLY PREFERRED EMBODIMENTS

Figure 1:
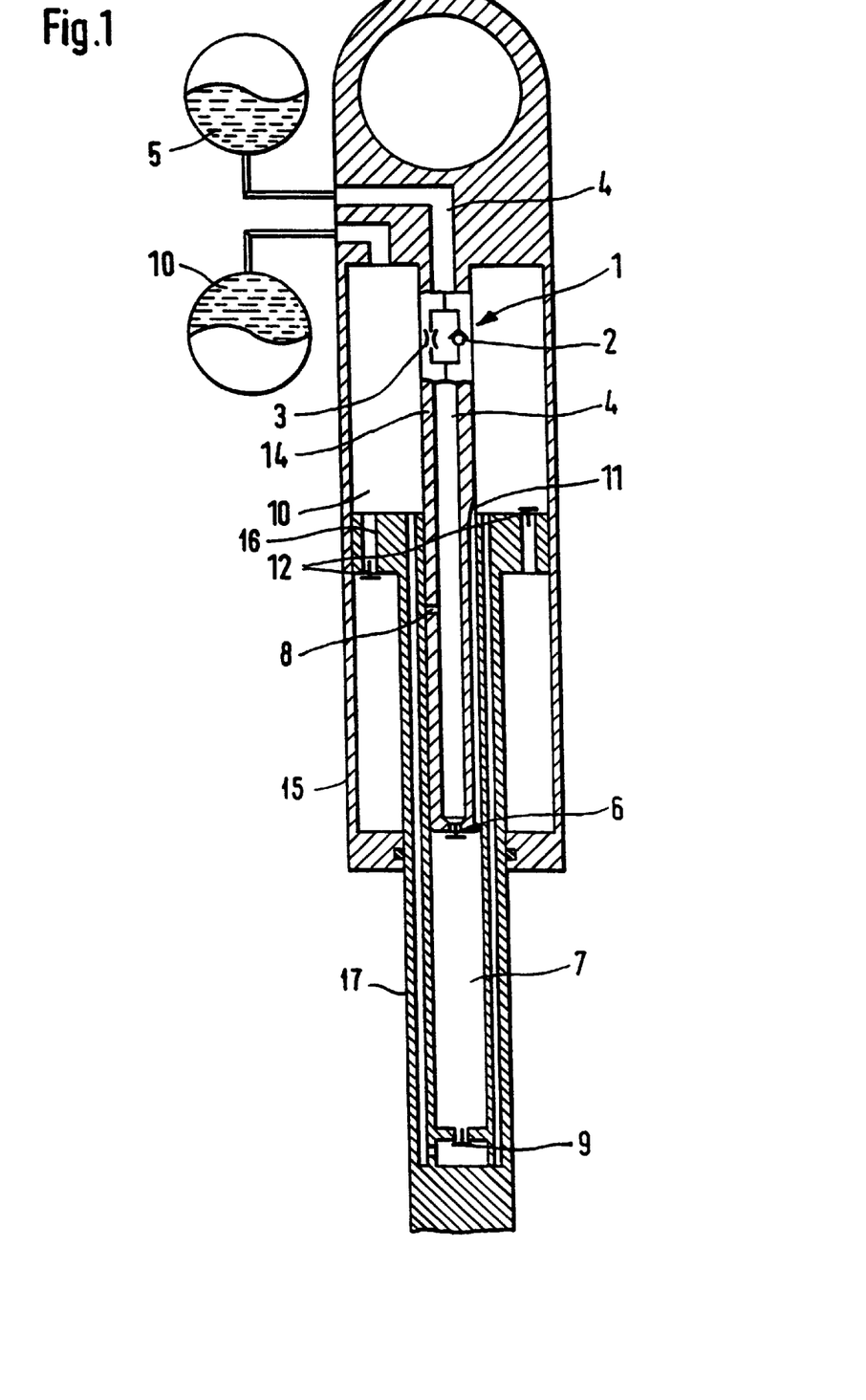
FIGS. 1 and 2 show sectional views of different embodiments of a self-pumping hydropneumatic spring strut with internal leveling according to the invention.

The spring strut for automobiles, which is illustrated in FIG. 1, consists essentially of the working cylinder 15, in which a piston 16 on the end of a piston rod 17 slides. The working cylinder 15 is correspondingly sealed off on both sides and is fastened in a way not shown to the body of an automobile or to the axle of an automobile. During driving, the damping forces are achieved by means of the damping valves 12.

The spring strut according to the embodiment of FIG. 1 has a separate discharge delay device 1, consisting of a non-return valve 2 and of a throttle 3 in the flow connection 4 between the low-pressure chamber 5 and the suction valve 6 of the pump cylinder 7.

The pump rod 14, together with the pump cylinder 7 of the piston rod 17, forms an oil pump. The movement of the vehicle axle and of the piston rod 17 fastened to the axle, resulting from road unevenness, actuate this oil pump which, constantly conveys oil out of the low-pressure chamber 5 via the outlet valve 9 into the working cylinder and consequently into the high-pressure chamber 10 under control of suction valves. As a result, the piston 16 and the piston rod 17 are pushed outward until the bleed orifice 8 of the pump rod 14 exposes a connection between the working cylinder, loaded with high pressure, and the low-pressure chamber 5, thereby initiating the bleed function. Piston 16 and piston rod 17 thus form a piston pump. The bleed function is active until the bleed orifice 8 is closed again by the piston A bypass orifice 11 between the high-pressure chamber 10 and the pump cylinder 7 is exposed when the pressure in the high-pressure space 10 has risen and loaded the piston rod 17. The bypass orifice 11 prevents further build-up (pumping up of the vehicle body). The piston 16 subdivides the high pressure chamber 10 into two working spaces one above and one below piston 16.

After the vehicle body has been relieved, the piston is pushed even further outward by the pressure in the high-pressure chamber 10, until the bleed orifice 8 is opened and pressure equalization takes place between the high-pressure chamber 10 and the low-pressure chamber 5. In order to prevent the vehicle body from descending too quickly, the non-return valve 2 closes the return, which results in the oil flowing into the low-pressure chamber 5 via the throttle 3. The discharge delay device 1 thus causes oil to flow throttle-free in the suction direction and throttled in the discharge direction. Since the non-return valve 2 opens in parallel with the throttle 3, the oil therefore flows, throttle-free, in the suction direction.

Figure 2:
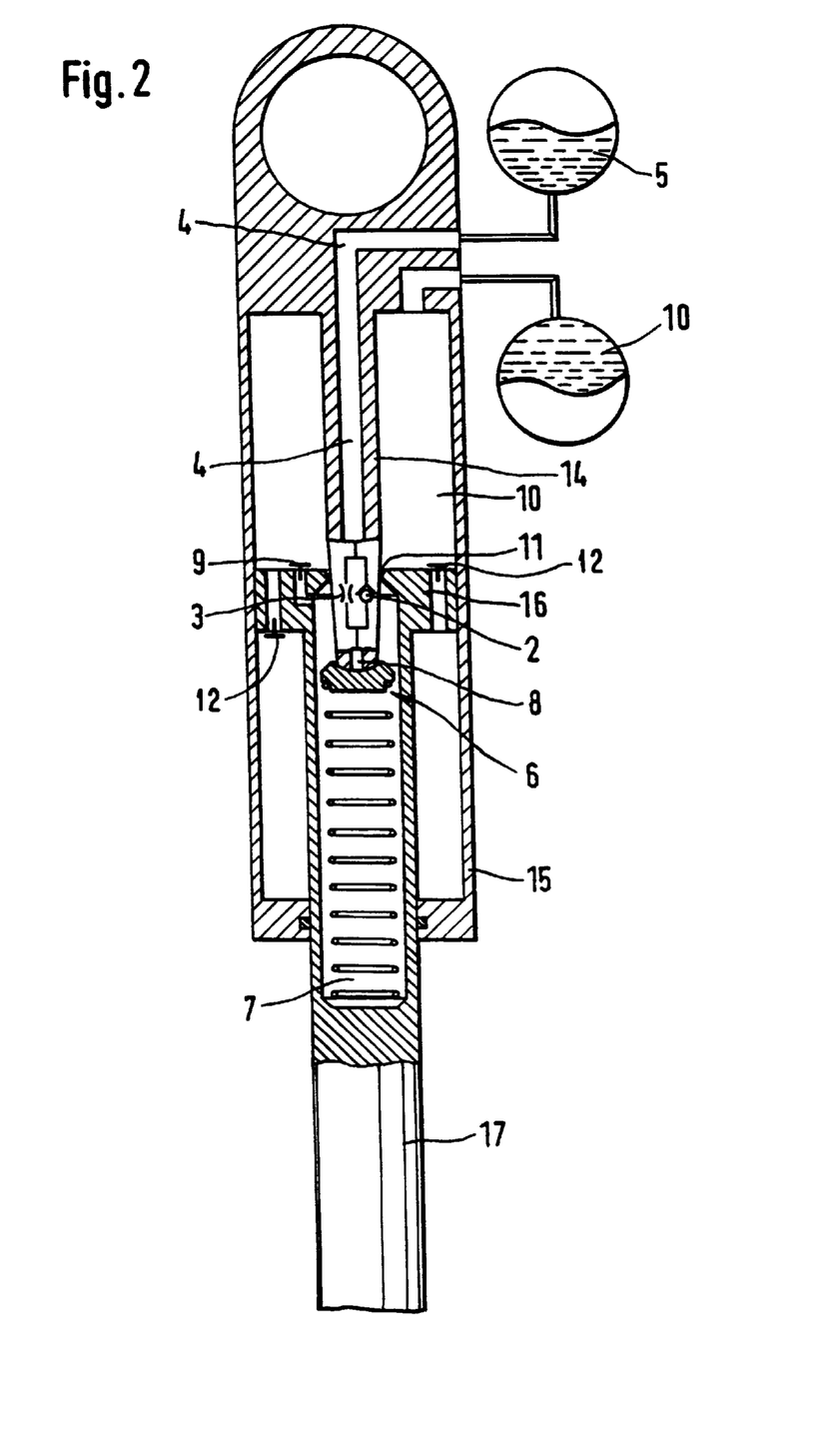

A further embodiment of a spring strut is shown in FIG. 2, in which the pump rod 14 is designed to be shorter, as compared with the exemplary embodiment according to FIG. 1, and the bleed orifice 8 is arranged in the end face of the pump rod 14. The inner wall pf [um[ rod 14 acts as a bleed duct for bleed orifice 8. As a result of the extension of the piston rod 17, the suction valve 6 and, consequently, the bleed orifice 8 are moved away from the end face of the pump rod 14, and the bleed function as previously described takes place. In this exemplary embodiment, the bypass 11 is designed as a conical circumferential face of the pump rod 14.

Figure 3A:
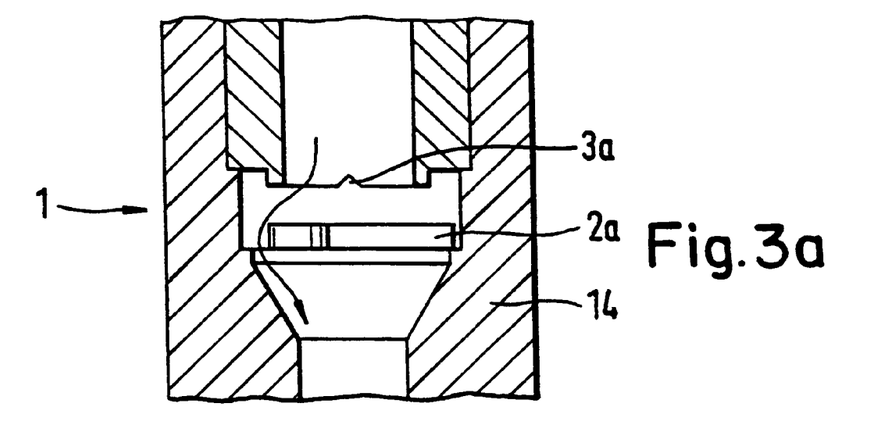
FIG. 3a is a partial sectional view of a throttle and a non-return valve within the pump rod according to an embodiment of the invention.
Figure 3B:
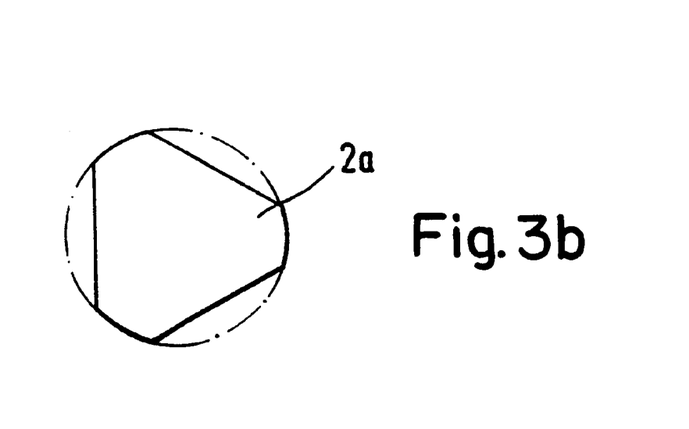
Figure 3C:
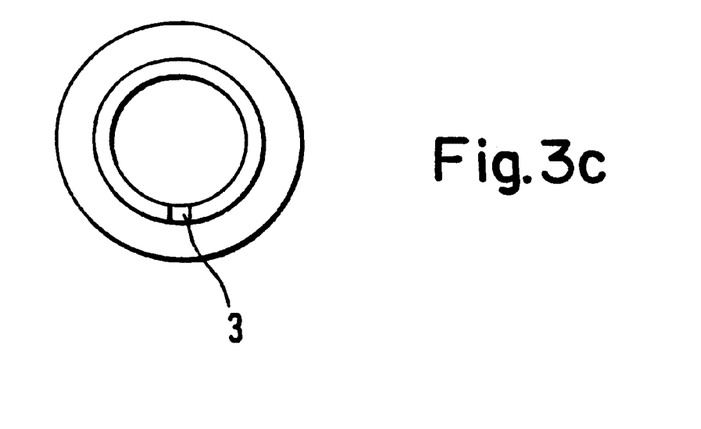

FIG. 3a illustrates part of the pump rod 14 in detail, where the non-return valve is designed as a platelike element 2a (FIG. 3b), and the throttle 3 is arranged as a recess 3a (FIG. 3c) in the end face of a tubular structural part. It may be inferred from the lower view that the platelike element 2a has a circumference that is not round, so that corresponding flow cross sections can be made available. The discharge delay device 1 in the pump rod 14 provides for the valve body 2 to be located on an abutment during the suction stroke (illustrated here), so that the oil can flush the throttle 3 free. By contrast, during the delivery stroke, the non-return valve 2, in the form of the platelike element 2a, is pressed onto the end face and the recess 3a alone allows the oil to pass through.

Figure 4A:
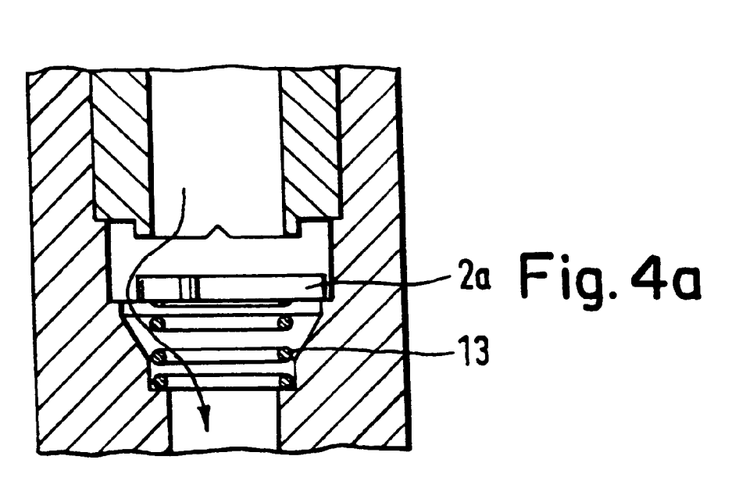
Figure 4B:
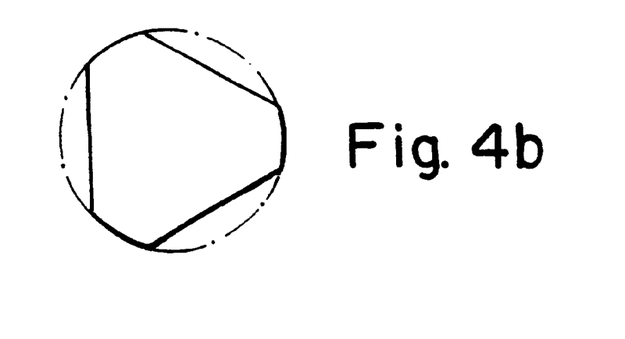
Figure 4C:
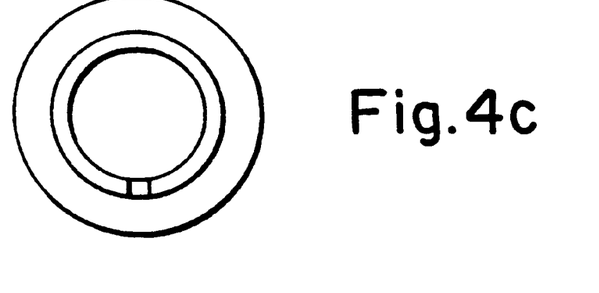

In FIGS. 4a–4c, the platelike element 2a is loaded by a spring 13, so that the suction stroke is opposed by a corresponding force, or the platelike element 2a can be assisted correspondingly in the delivery stroke.

Figure 5A:
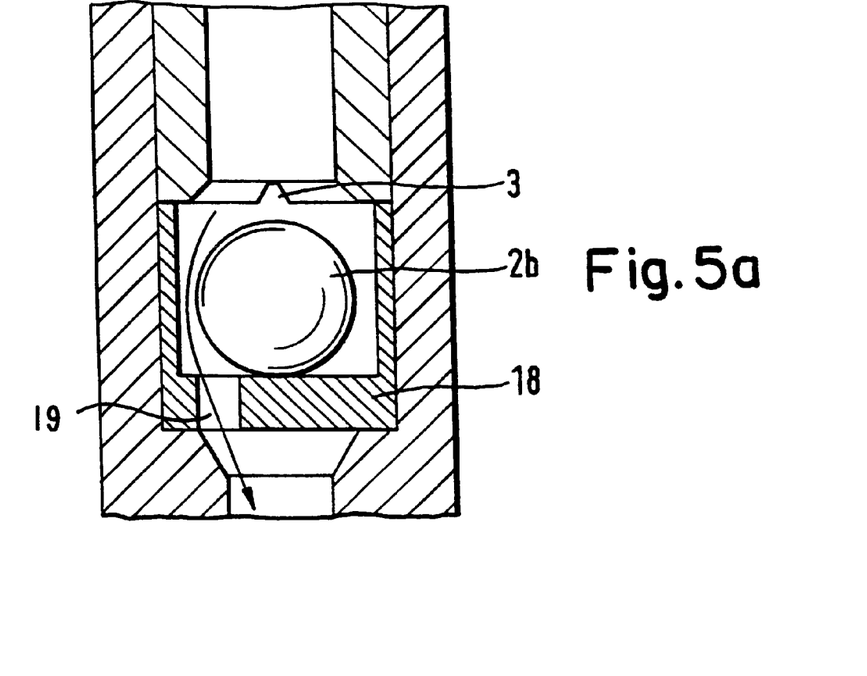
FIG. 5a is a partial sectional view of a throttle and a non-return valve according to another embodiment of the invention.
Figure 5B:
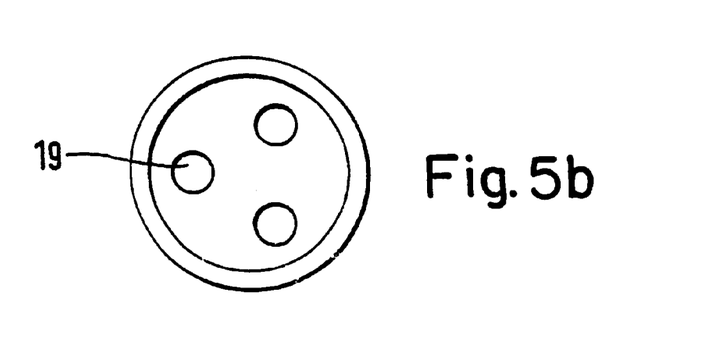
Figure 5C:
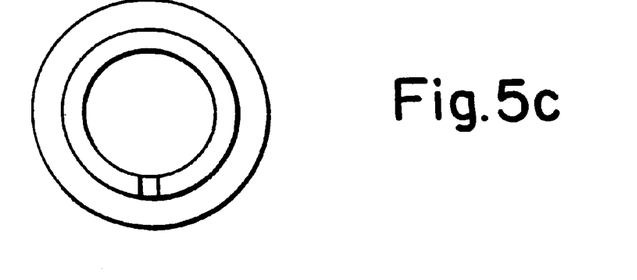

In Figures 5a–5c, a structural part 18, which has flow bores 19, is provided as a non-return valve 2, and a ball 2b is provided as a valve body. FIG. 5 depicts the suction stroke, where throttle 3 is completely free and the oil flows through the flow bores 19. By contrast, during the delivery stroke, the ball 28 is laid onto the end face on the opposite side and the oil can flow only through the throttle 3.

Figure 6A:
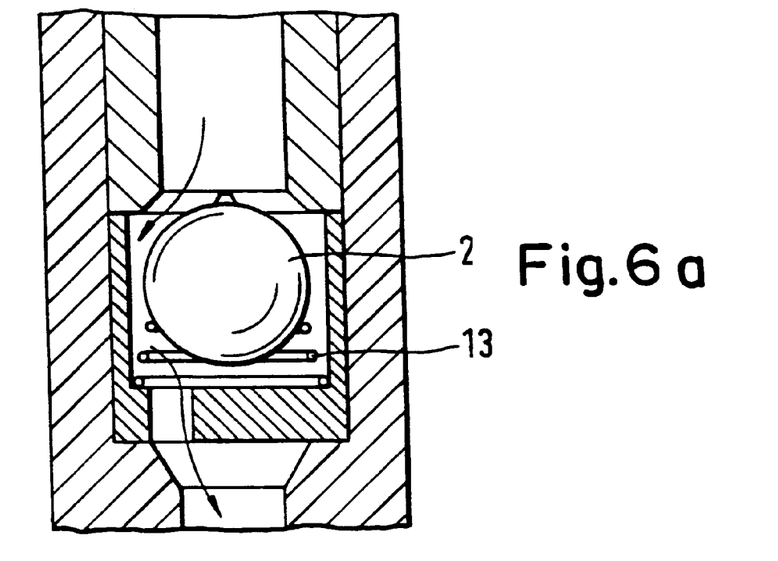
Figure 6B:
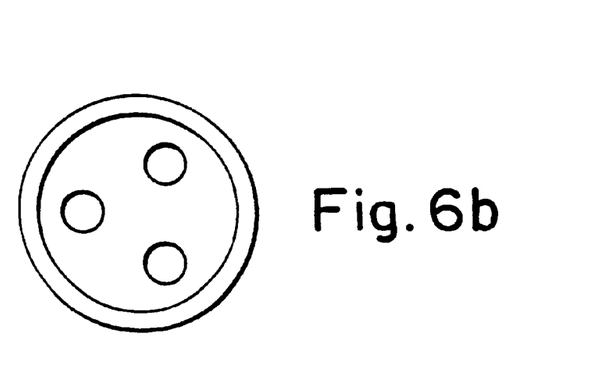
Figure 6C:
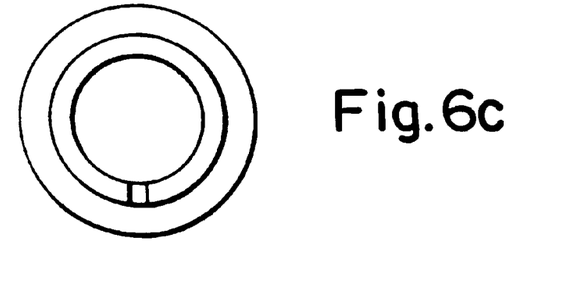
Figure 7:
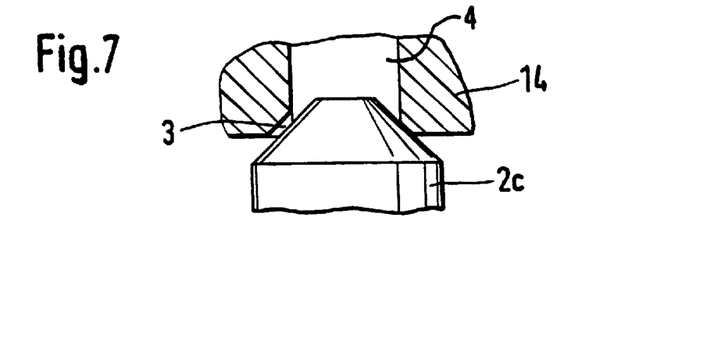
FIGS. 7 to 10 each show various geometries of the valve body according to the invention.
Figure 8:
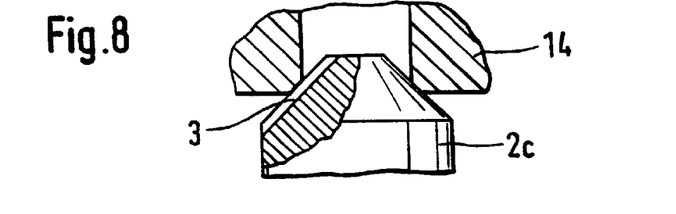
Figure 9:
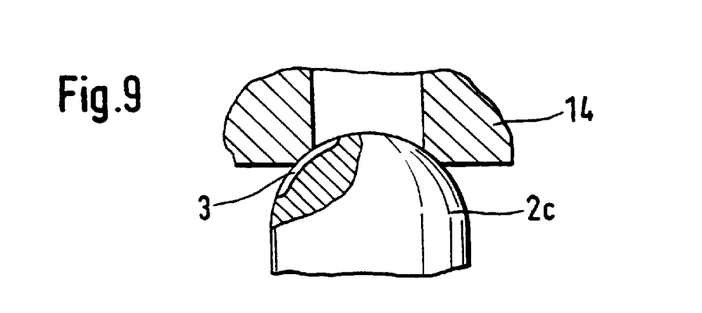
Figure 10:
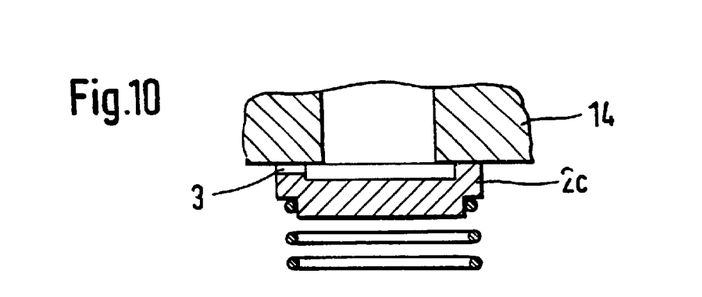

In FIGS. 6a–6c, the ball 2b is assisted by a spring 13. This embodiment otherwise corresponds to that already shown in FIG. 5.

FIGS. 7 to 10 illustrate other embodiments of non-return valves, the valve bodies 2c of which form a corresponding throttle 3 relative to the pump rod 14 by means of variously configured recesses. Throttle 3, in each case, is formed by a cross-sectional narrowing of the flow channel or connection 4.

Figure 11:
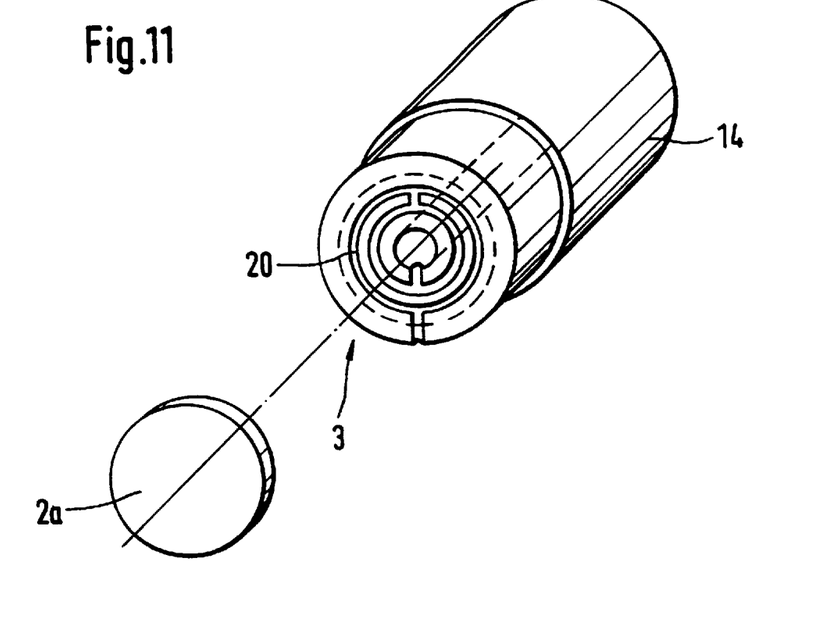
FIGS. 11 and 12 show two different respective embodiments of a throttle duct as a projection.
Figure 12:
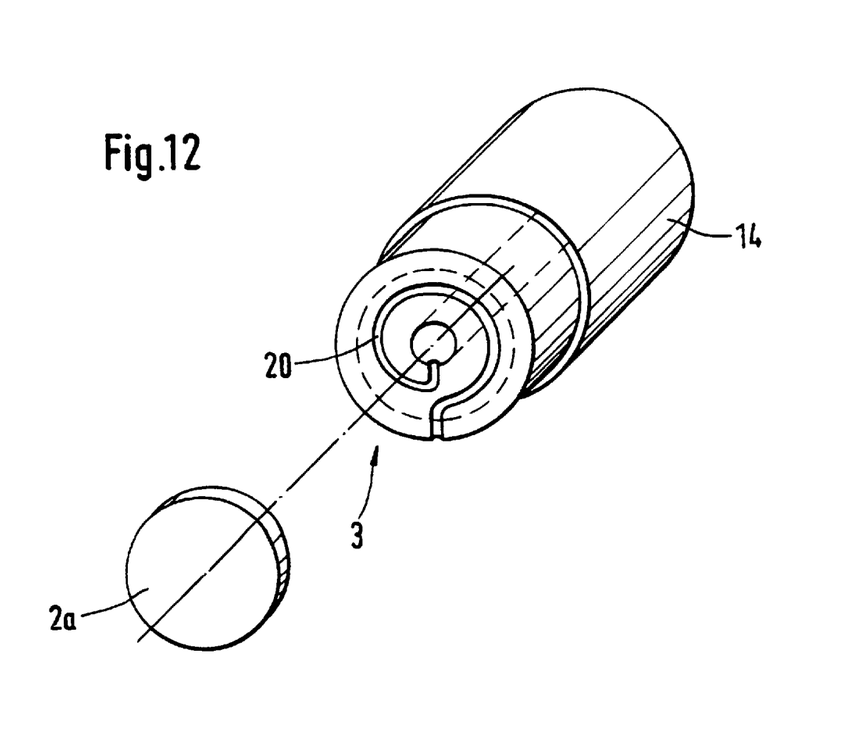
Figure 13:
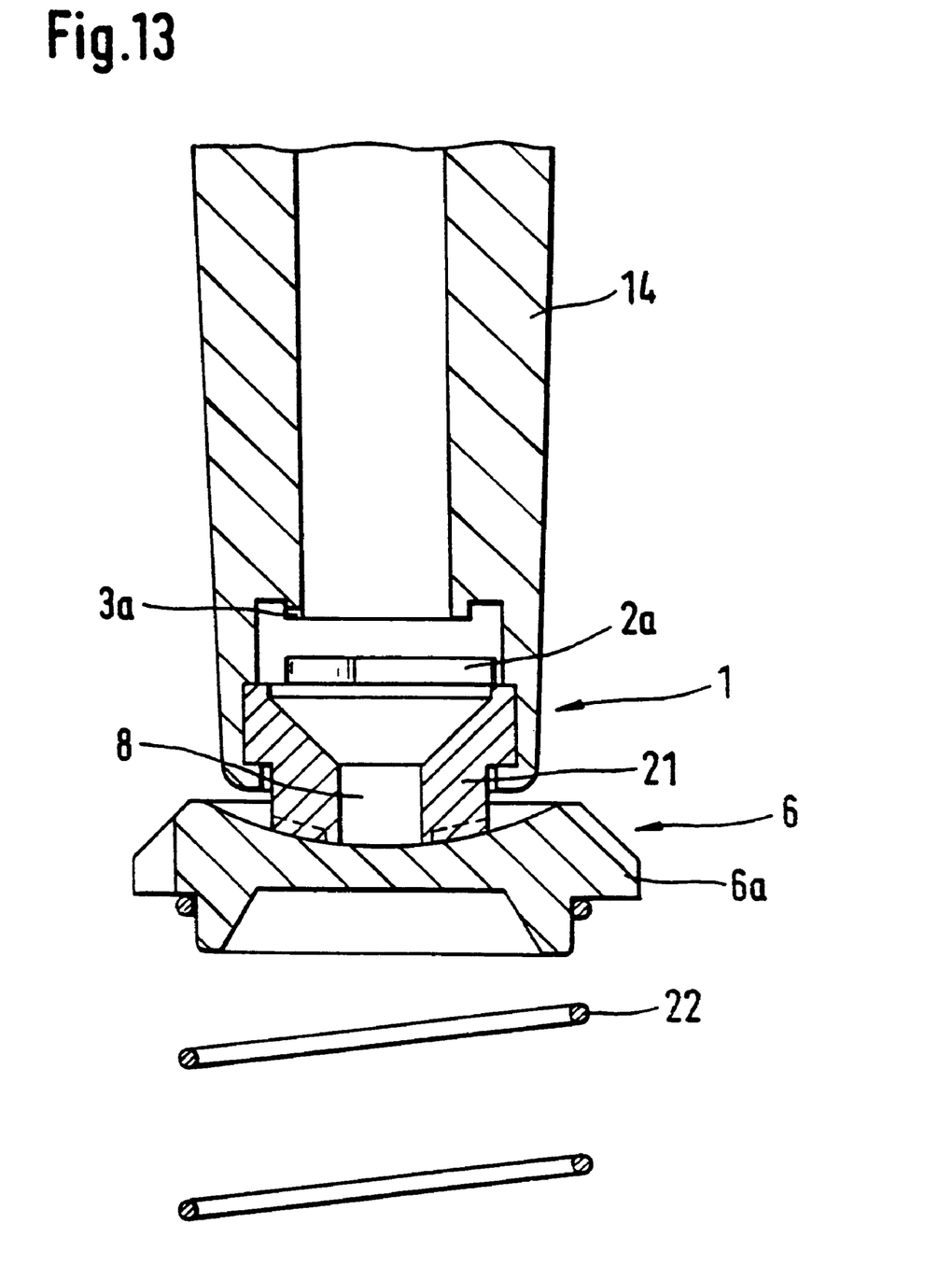
FIG. 13 shows the end face of the pump rod, together with the throttle and non-return valve, according to an embodiment of the invention.

Two embodiments of the end face of the pump rod 14 may be seen from FIGS. 11 and 12. When loaded by the platelike element 2a and with corresponding ducting, the end face of pump rod 14 forms the discharge delay device. In this case, the ducts 20 are designed with a corresponding length, so that the oil runs through the throttle 3 with a time delay. FIG. 13 is a detailed illustration of the discharge delay device 1 already illustrated in FIG. 2. The pump rod 14 includes the recess 3a on its end face as a throttle, which cooperates with the platelike element 2a of the non-return valve 2. In the suction stage, the structural part 21 forms on one side the abutment for the platelike element 2a (shown here) and, on the opposite side, the valve seat for the suction valve 6. The valve body 6a of suction valve 6 is supported via a spring 22, in the interior of the hollow piston rod 17. As already described with reference to FIG. 2, the suction valve 6 opens when the piston 16, together with the piston rod 17, is correspondingly extended.

Figure 14:
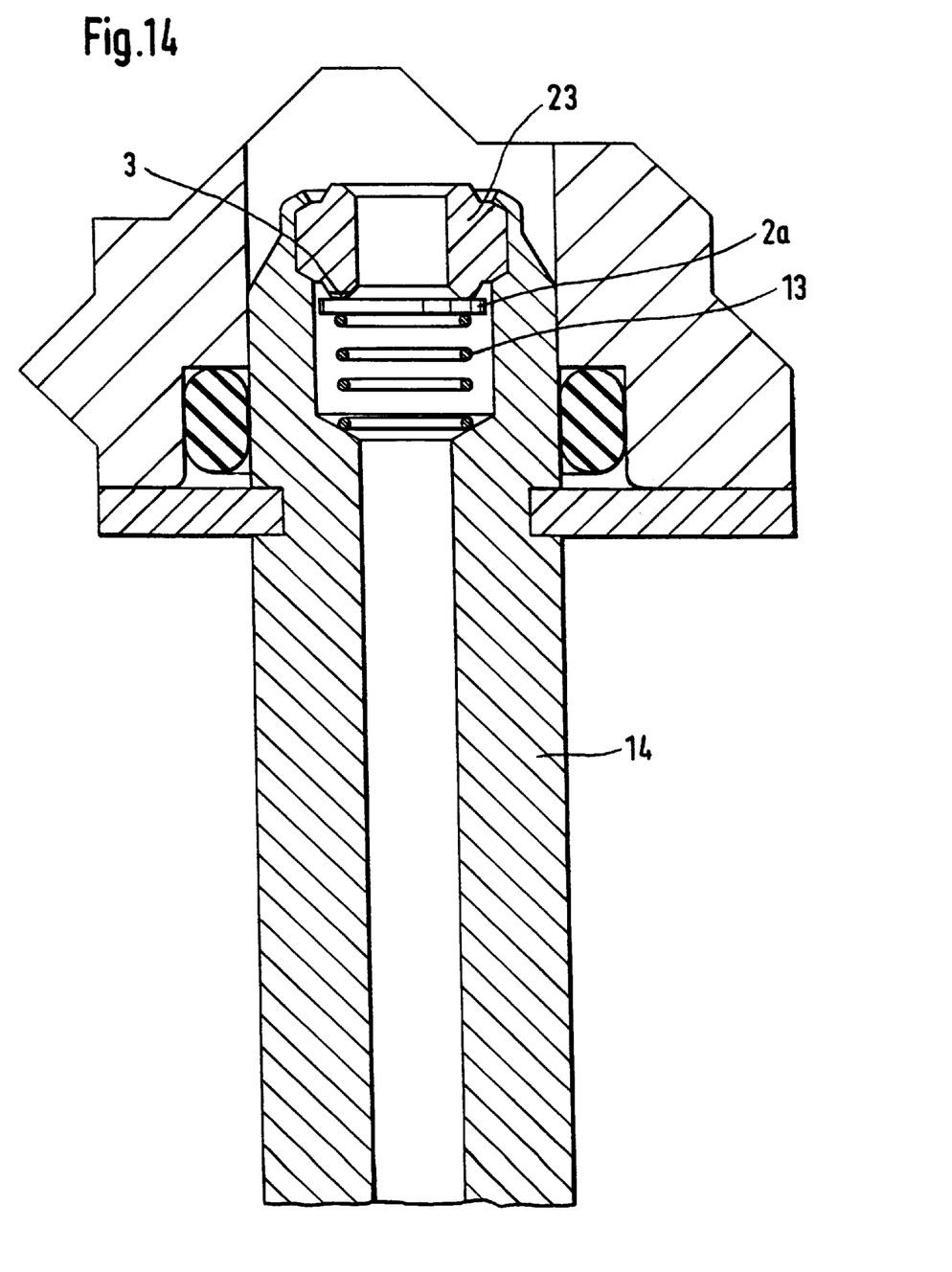
FIG. 14 shows yet a further embodiment of a non-return valve according to the present invention.

FIG. 14 shows the pump rod 14, together with a platelike element 2a on an enlarged scale. As shown, the platelike element 2a is supported on the pump rod 14 via a spring 13. In this case, the throttle 3 is an integral part of a separate structural part 23. The separate structural part 23 is received positively and/or negatively in the end region of the pump rod 14.

The invention is not limited by the embodiments described above which are presented as examples only but can be modified in various ways within the scope of protection defined by the appended patent claims.

We claim:

1. A self pumping hydro-pneumatic spring strut with internal leveling comprising:

an oil-filled working cylinder;

a piston slidably disposed within said working cylinder;

a hollow piston rod connected to and carrying said piston;

a high pressure chamber within said working cylinder and having at least one gas cushion formed therein acting as a spring force on said working cylinder, said working cylinder being under pressure by said at least one gas cushion, said piston dividing said high pressure chamber into two working spaces;

a hollow pump rod arranged in said hollow piston rod, having a first end facing toward the working cylinder and a second end opposed to said first end, said hollow piston rod forming a pump cylinder for slidably receiving said hollow pump rod, said hollow pump rod defining a bleed duct;

a bleed orifice connected to said bleed duct and disposed toward the second end of said hollow pump rod, said bleed orifice being closed as a function of a position of said working piston;

a suction valve connected to said bleed orifice;

a low pressure chamber connected to said hollow pump rod and said suction valve;

a piston pump formed by said piston rod and said piston, said piston pump being driven by the spring force to convey oil out of the low pressure chamber into one of said two working spaces connected to the high pressure chamber and the pump cylinder;

a throttle arranged at an end of the pump rod, wherein said bleed duct has an opening into said low pressure chamber, said bleed orifice connecting the working space connected to the high pressure chamber to said bleed duct;

a non-return valve arranged parallel to said throttle and being a plate like element for enabling oil flow to pass from said low pressure chamber in a direction of said pump cylinder said non-return valve being controlled into one of two possible positions in response to the oil flow; and at least one spring operatively arranged to load at least one side of said plate like element.

2. The spring strut in accordance with claim 1, wherein said throttle and said non-return valve are formed of a common structural part.

3. The spring strut in accordance with claim 1, wherein said throttle comprises a cross-sectional narrowing.

4. The spring strut in accordance with claim 1, wherein said plate like element comprises a non-round circumference.

5. The spring strut in accordance with claim 1, wherein said throttle comprises a recess at an end face of said pump rod which operatively cooperates with said plate like element.

6. The spring strut in accordance with claim 1, wherein said plate operatively cooperates with an end face of said pump rod.

7. The spring strut in accordance with claim 6 wherein said throttle comprises a recess formed between an end face of said pump rod and said plate like element.

8. The spring strut in accordance with claim 2, wherein said structural part is received within said pump rod.

9. The spring strut according to claim 1, wherein said strut is arranged inside said pump rod.

10. A self pumping hydro-pneumatic spring strut with internal leveling comprising:

an oil filled working cylinder;

a piston slidably disposed within said working cylinder;

a hollow piston rod connected to and carrying said piston;

a high pressure chamber within said working cylinder and having at least one gas cushion formed therein acting as a spring force on said working cylinder, said working cylinder being under pressure by said at least one gas cushion, said piston dividing said high pressure chamber into two working spaces;

a hollow pump rod arranged in said hollow piston rod, having a first end facing toward the working cylinder and a second end opposed to said first end, said hollow piston rod forming a pump cylinder for slidably receiving said hollow pump rod, said hollow pump rod defining a bleed duct;

a bleed orifice connected to said bleed duct and disposed toward the second end of said hollow pump rod, said bleed orifice being closed as a function of a position of said working piston;

a suction valve connected to said bleed orifice;

a low pressure chamber connected to said hollow pump rod and said suction valve;

a piston pump formed by said piston rod and said piston, said piston pump being driven by the spring force to convey oil out of the low pressure chamber into one of said two working spaces connected to the high pressure chamber and the pump cylinder;

a throttle arranged at said second end of the piston rod, wherein said bleed duct has an opening into said low pressure chamber, said bleed orifice connects the working space connected to the high pressure chamber to said bleed duct; and a non-return valve arranged parallel to said throttle and being a ball element for enabling oil flow to pass from said low pressure chamber in a direction of said pump cylinder said non-return valve being controlled into one of two possible positions by the oil flow.

11. The spring strut according to claim 10, wherein said strut is arranged inside said pump rod.

* * * * *